United States Patent Office 2,807,782
Patented Sept. 24, 1957

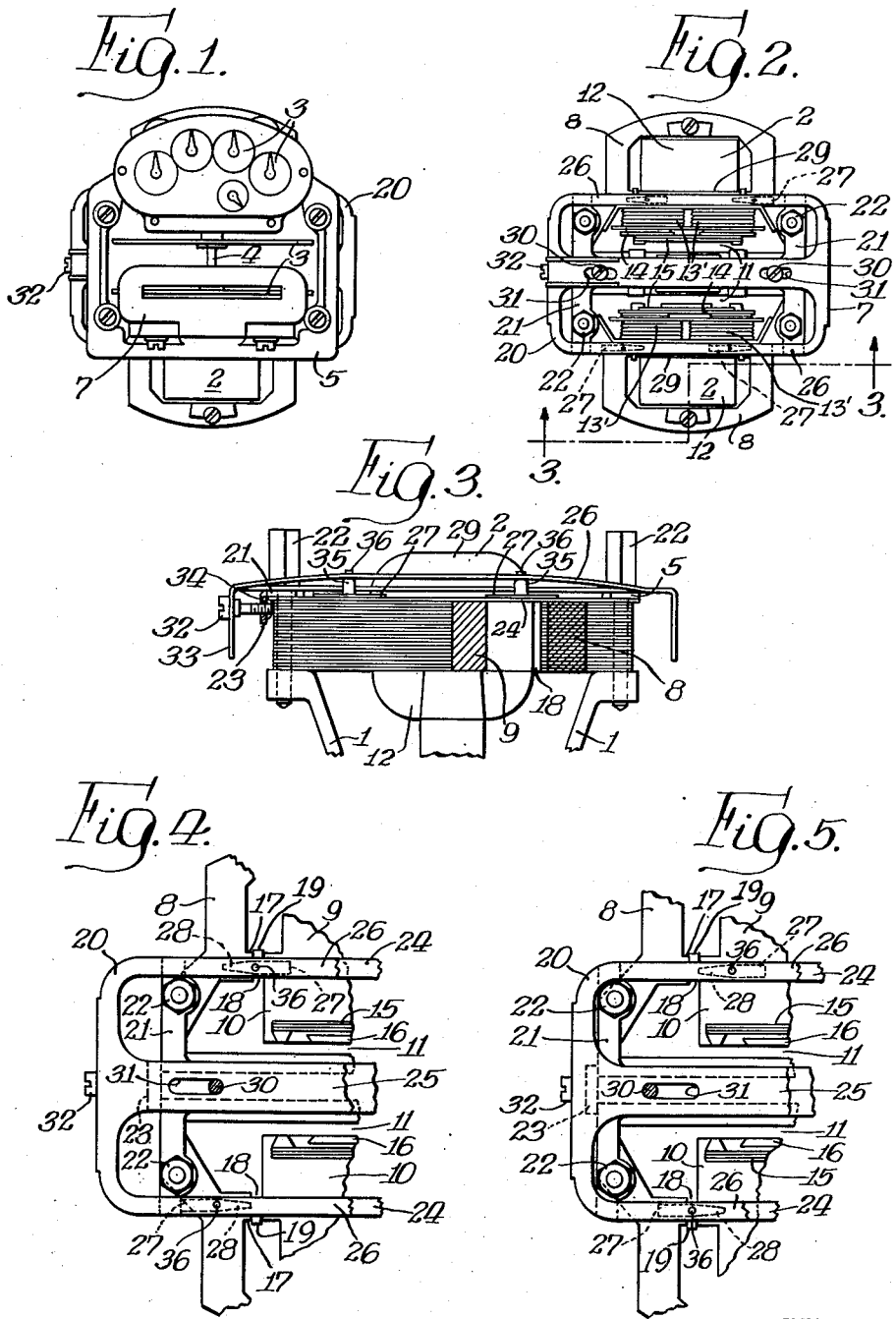

2,807,782

TORQUE BALANCING ADJUSTMENTS FOR POLYPHASE WATTHOUR METERS

Griffin G. Waite and Albert Russell, Toronto, Ontario, Canada, assignors to Sangamo Electric Company, Springfield, Ill., a corporation of Illinois Application February 2, 1951, Serial No. 209,027

Claims priority, application Canada November 14, 1950

3 Claims. (Cl. 324—137)

This invention relates to a torque balancing adjustment for polyphase watthour meters. As is well known in induction polyphase watthour meters a current and potential coil wound on a magnetic core to form an electro-magnet is provided for each of the phases to be measured to create fluxes for driving a registering disc.

In practice it is impossible to provide electro-magnets which are physically identical and there will invariably be some difference for instance in the orientation or tightness of the windings, variations in lamination thickness etc., and as a consequence no two electromagnets will produce exactly the same flux and hence torque even when operating under precisely identical electrical conditions.

The result is that in practical polyphase watthour meter designs the electromagnet measuring the power in one phase will not produce precisely the same torque per watt measured as the electromagnet measuring the power in another phase, occasioning an unbalanced torque on the registering disc or discs, which unbalance must be compensated for to enable the accurate power measurements to be obtained.

At present it is a tedious time-consuming operation to correct for this torque unbalance in obtaining meter calibration, it being necessary to go back and forth from one magnet to the other as adjustment for calibration is sought, with the total torque on the disc being varied by each adjustment.

The present invention has for its objects to overcome the above objections experienced with present methods of torque unbalance adjustment and the principal object is to enable the torque of the electromagnets to be precisely balanced in an extremely expeditious manner.

Another important object is to maintain the total torque of the electromagnets constant as torque balancing proceeds, to greatly facilitate and decrease the time taken for meter calibration.

Still a further object is to provide an adjustment means as aforesaid which will hold accurate adjustment indefinitely.

A still further object is to provide a torque balancing adjustment of simple and economical manufacture which can be incorporated into standard polyphase watthour meter construction.

The principal feature of the invention resides in controlling the leakage flux of the electromagnets in a differential manner by providing a novel differential shunt arrangement to divert an increasing proportion of the electromagnet flux from cutting the meter disc in one electromagnet while simultaneously decreasing the diversion of the flux from cutting the metering disc in the other electromagnet during the making of the shunt adjustment, while maintaining the total flux cutting the discs constant.

According to the invention herein depicted, the electromagnets are arranged in substantially the same vertical plane and a slide provided with shunting shoes for each electromagnet is mounted to slide transversely of the electromagnets, the disposition of the slide and the shoes being such as to effect upon operation of the slide the movement of shoes associated with one electromagnet in a direction to increase the shunted flux by-passing the disc, while the shoes associated with the other electromagnet are simultaneously moved in a direction to decrease the shunted flux.

Another important feature resides in the novel formation of the shoes to provide the continuously and linearly variable torque differential.

A still further feature consists in operating the slide with a screw-threaded control for accurate adjustments. These and other objects and features will become apparent with reference to the accompanying drawings in which Figure 1 is a front elevational view of a polyphase watthour meter element.

Figure 2 is a view similar to Figure 1 but with the registering discs, gear trains and dials removed to disclose the torque balancing adjustment.

Figure 3 is an enlarged sectional view taken on the line 3—3 of Figure 2.

Figure 4 is an enlarged fragmentary diagrammatic view illustrating the differential shunting effected with the torque balance adjustment in one extreme position.

Figure 5 is a view similar to Figure 4 but showing the other extreme of adjustment.

With reference to the drawings, the polyphase watthour meter includes a main frame 1 carrying a pair of electromagnets 2 to drive a pair of registering discs 3 secured on a common shaft 4 rotatably mounted in journals (not shown) on an auxiliary frame 5 carrying the registering dial and damping magnet assembly 7.

As the details of the frame constructions, damping magnet, driving gear train for the registering dials form no part of the invention, no further details are deemed necessary.

Referring to Figure 2, it will be seen that each of the electro-magnets 2 comprises an outer somewhat D-shaped core section 8 and a central core section 9 formed at the ends to provide the spaced legs 10, the terminii of which define with the outer core section a slot 11 to receive a registering induction disc 3. The details of these electromagnets 2 are fully disclosed in co-pending application Serial Number 561,065, but as will be seen herein the central core 9 has wound thereon a potential coil 12 and windings 13' on the legs 10 forming a current coil. Also mounted on the legs 10 is a suitable adjustable resistance pigtail lag winding 14 and suitable lag loop plates 15 to provide class II temperature compensation.

The coil assemblies are maintained on the centre core 9 by a suitable wedge plate 16 forming a magnetic leakage path between the legs 10.

As shown in Figure 2 and particularly in Figures 4 and 5, the outer core section 8 has a short inwardly extending leg portion 17 opposite each of the central core legs 10 to define a relatively narrow gap 18 maintained by the spacers 19 affording a leakage path for flux produced by energization of the central core coils.

By providing potential and current coils on the electromagnets and arranging the flux produced thereby to cut a disc extending into their slots 11 a motoring action is produced upon having the flux of the potential coil lagging the flux of the current coils, as is well understood in the art, and the pigtail lag winding 14 and lag loop plates 15 are provided to lag the potential flux 90° behind the current flux for correct meter calibration.

In a polyphase watthour meter such as illustrated herein the pair of electromagnets are simultaneously energized to obtain measurements in separate phases of a polyphase circuit to measure the total power being consumed.

As has been explained, one of the essentials in a practical meter design is to correct for the physical differences of the electromagnets leading to differences in the torques produced thereby with a resulting unbalance between the torques on the discs 3 driving the shaft 4, giving rise to an error in the meter reading.

To counteract and balance this torque unbalance while maintaining the total torque constant, a slide 20 is provided to move transversely of the legs 10 of the central electromagnet core 9 and parallel to the disc-receiving slots 11. The slide 20 slides on a stationary frame 21 clamped to the bases of the electromagnets 2 by the bolts 22 engaging the main frame 1. This frame 21 is provided with a downturned lug 23 at one side of the magnet at the ends of the slots 11 and carries two strips of Phosphor bronze 24 which are aligned with the leg portions 17 of the outer core section 8 and bridging the gaps 18.

The slide 20 is a non-magnetic stamping defining a central strip 25 and parallel border strips 26, the latter overlying the strips 24 of the frame 21. Depending from each of the slide border strips 26 are a pair of shunting shoes 27 having long, pointed end portions 28, shown particularly in Figures 3 and 4. These shoes ride on the strips 24 of the frame 21, which form trackways between the insulation laminii 29 of the potential and current coils.

It will be clearly seen from Figures 4 and 5 that the shoes at one side of the slide are oppositely pointed to those at the other side and their disposition on the sides or border strips 26 is such that with the shoes at one side in bridge across the gaps 18 of one electromagnet at one extreme of the slide movement the shoes 27 at the opposite side of the slide are clear of the gaps 18 (Figure 4). Then as the slides move from Figure 4 to Figure 5 the upper-depicted shoes 27 will be moved in a direction to withdraw their pointed or tapering ends 28 across the gaps 18, while the pointed ends 28 of the lower depicted shoes will advance across the gaps 18 of the opposite electromagnet, until in the extreme position of Figure 5 the upper shoes will have been retracted from the gaps 18 while the lower shoes are in full bridge across the gaps 18, with the full width of the shoes available to form a leakage flux path.

It will be appreciated that the result obtained will afford a differential action to control the leakage path reluctance across the gaps 18 and hence the leakage flux in the two electromagnets.

Movement of the slide 20 is guided by the centering screws 30 operating in the slots 31 in the central strip 25 and actuation of the slide is effected by means of the screw 32 fixed to the downturned edge flange 33 of the slide and engaging in a threaded orifice 34 in the lug 23 of frame 21.

It will be seen from Figure 3 that the narrow border strips 26 of the slide form resilient members deflectible out of the plane of the slide, and the shoes 28 are urged into contact with their tracks 24 by these strips 26 engaging the posts 35 to which the shoes are secured.

To permit the shoes to accurately follow their tracks 24 between the insulation laminii 29 the posts 35 are secured to the slide strips 26 by pivots 36. As shown in Figure 3, the Phosphor bronze trackway strips 24 of the stationary frame 21 function as non-magnetic tracks or guide surfaces which mechanically bridge the adjacent ends of the gaps 18. Thus, by having the magnetic shunting shoes arranged to slide on these track surfaces 24, there is no possibility of the pointed ends of the shunting shoes 27 snapping into the gaps 18 or striking edges of the gaps in the shifting adjustment of the shoes, notwithstanding the fact that these shunting shoes are continuously pressed inwardly toward the core sections 8 and 9 by the resilient pressure of the outwardly flexed margin strips 26 of slide frame 20 (Figure 3).

From the foregoing the operation of the torque balancing adjustment will be readily appreciated. The torque on the discs 3 depends on the flux cutting the discs and therefore can be varied by alteration of the reluctance path across the gaps 18 to shunt flux which otherwise would cut the discs. By having the differential arrangement of the shoes and slide as above described, a differential in the proportion of shunted flux is obtained to provide a differential control of the torque produced by flux in the current and potential windings of the electromagnets, and this differential arrangement enables any differential in the unbalance torque provided between the fluxes of the electromagnet to be exactly balanced out without effecting the sum of the torques of the two electromagnets.

The screw 32 allows a very exact control of the slide movement as guided by screws 30, and with this screw control and the friction obtained between the slide 20 and frame 21 the slide will accurately maintain adjusted position.

In the particular form of the invention herein illustrated the shape of the shoes and their disposition permits of a continuous linear differential variation of the torque produced by the electromagnets.

It will be appreciated that the electromagnets need not be co-planar to incorporate a differential control according to the invention and they may be located in any orientation wherein the disc-receiving slots 11 are parallel and the electromagnets may of course be positioned to operate on the same disc.

It will be understood that these and other modifications may be made without departing from the scope of the invention as set forth in the appended claims.

What we claim as our invention is:

1. In a polyphase watthour meter, a pair of electromagnets each having peripheral and central core portions having thereon potential and current windings and defining therebetween an induction disc-receiving slot, a rotatable disc entered in the slot of each of said electromagnets to be cut by flux traversing said slot, said pair of electromagnets being arranged with the lengths of their slots parallel, a torque balancing adjustment differentially controlling the fluxes traversing said slots, said torque balancing adjustment comprising a slide movable parallel to the lengths of said slots and carrying sets of magnetic shunting shoes contiguous to each of said electromagnets to move into a position bridging said peripheral and central cores for shunting flux from said slots, said shoes being relatively spaced and constituted with respect to said electromagnets so that shifting movement of said slide causes one set of said shunting shoes to move into core-bridging relation with one of said electromagnets and simultaneously therewith causes another set of said shunting shoes to move out of said core-bridging relation with the other of said electromagnets, said movement into core-bridging relation and said movement out of core-bridging relation occurring in a fixed predetermined ratio, whereby to effect a torque balancing adjustment differentially between said electromagnets but independently of any change in any portion of the flux gap span of the disc-receiving slots of said electromagnets, and resilient means for resiliently pressing said magnetic shunting shoes toward said core portions.

2. In a polyphase watthour meter, a pair of parallel electromagnets each having an outer peripheral core portion and a central inner core portion having thereon potential and current windings and defining with said peripheral core portion an induction disc-receiving slot, a rotatable disc entered in the slot of each of said electromagnets to be cut by a flux produced by said windings and traversing said slots, the discs of said two electromagnets being mounted coaxially and arranged to rotate together in the same direction, each of said disc-receiving slots being of permanently fixed dimensions between its respective outer peripheral core portion and its central inner core portion, and a torque balancing adjustment differentially controlling flux traversing said slots, said torque balancing adjustment comprising non-magnetic guide means extending in non-magnetic bridging relation between the outer peripheral core portion and the central inner core portion of each electromagnet, a slide movable transversely of said inner core portion and parallel to said disc-receiving slots, a pair of magnetic shoes each having an elongated pointed end carried at each side of said slide with the shoes at one side being pointed oppositely to the shoes at the other side, said shoes having sliding movement on said non-magnetic guide means and being positioned to move into and out of core bridging relation across the central and peripheral core portions of said electromagnets with the shoes at one side of said slide moving out of core-bridging relation simultaneously with the movement of the shoes at the other side of said slide into core-bridging relation, whereby to effect torque balancing adjustments differentially with respect to said two electromagnets and independently of the permanently fixed dimensions of their disc-receiving slots, and resilient means normally pressing said magnetic shoes against said non-magnetic guide means.

3. In a polyphase watthour meter, a pair of coplanar opposed electromagnets each having an outer peripheral core portion surrounding a central inner core portion terminating at one end adjacent said peripheral core portion to define an induction disc-receiving slot therebetween and having potential and current windings mounted thereon, a rotatable disc entered in the slot of each of said electromagnets to be cut by the potential and series fluxes produced by said windings and traversing said slots, each of said disc-receiving slots being of permanently fixed span with respect to the series flux traversing said slot, each of said electromagnets having its core portions formed to provide a leakage path between said central and outer core sections to each side of said central core section and aligned in a direction parallel to said slot to divert flux from flow across said slot, and a torque balancing adjustment differentially controlling flux traversing said slots, said torque balancing adjustment comprising a stationary guide frame secured to said electromagnets and including non-magnetic trackways bridging the leakage paths in each of said electromagnets, a non-magnetic slide frame mounted on the outer side of said stationary guide frame for sliding movement parallel to said slots, a pair of magnetic shoes each formed with a pointed end secured to each side of said slide frame and spaced the distance of and aligning with the leakage paths of one of said electromagnets, with the shoes at one side being pointed oppositely to the shoes at the other side of said slide, said shoes having sliding engagement against the non-magnetic trackways of said stationary guide frame, the adjusting movement of said slide frame causing said shoes to be relatively displaced in the direction of said slots to move into and out of bridging relation across said leakage paths with the shoes at one side moving out of bridging relation as the shoes at the other side move into bridging relation in fixed inverse ratio thereto, said slide frame comprising resilient marginal portions operative to hold said shoes resiliently pressed against said non-magnetic trackways, and manually operated means for shifting said slide frame on said non-magnetic guide means.

References Cited in the file of this patent
UNITED STATES PATENTS

| | | |
|---|---|---|
| 1,180,795 | Pratt | Apr. 25, 1916 |
| 1,260,381 | Hodde et al. | Mar. 26, 1918 |
| 1,684,191 | Mylius et al. | Sept. 11, 1928 |
| 2,057,443 | Mylius et al. | Oct. 13, 1936 |
| 2,119,015 | Kurz | May 31, 1938 |
| 2,160,416 | Green | May 30, 1939 |
| 2,170,753 | Green | Aug. 22, 1939 |
| 2,352,965 | Mendelsohn | July 4, 1944 |
| 2,359,129 | Leippe | Sept. 26, 1944 |
| 2,626,297 | Leippe | Jan. 20, 1953 |